No. 609,370. Patented Aug. 16, 1898.
J. W. SARGEANT.
PLOW.
(Application filed Jan. 11, 1897.)
(No Model.)
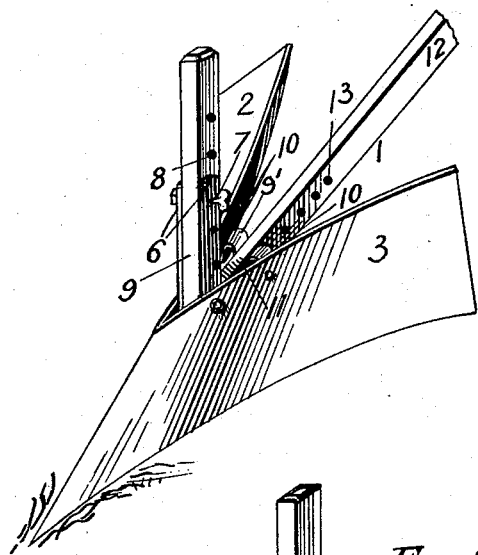
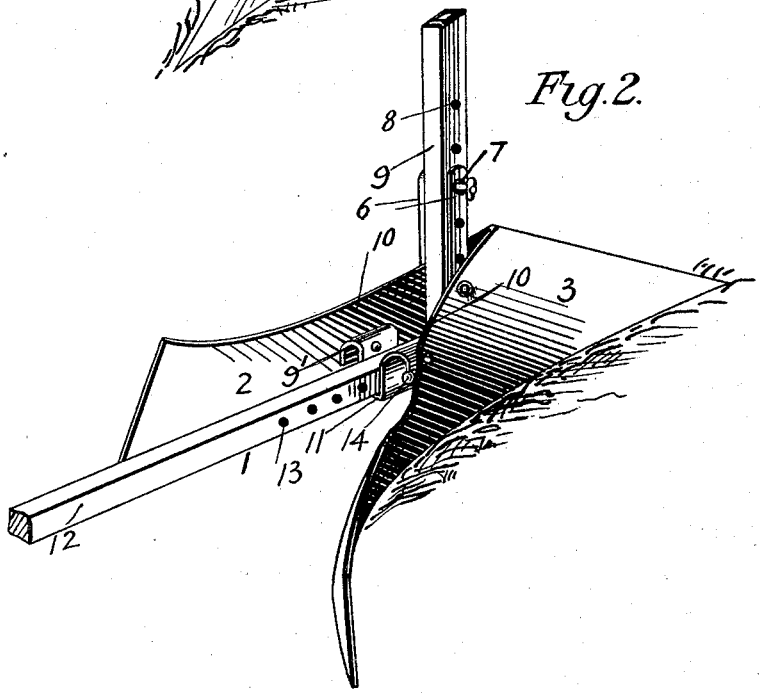
WITNESSES
J. T. Bowen,
C. D. Hasler,
INVENTOR:
John W. Sargeant,
By John Wedderburn
Attorney

UNITED STATES PATENT OFFICE.

JOHN W. SARGEANT, OF ELMWOOD, NEBRASKA.

PLOW.

SPECIFICATION forming part of Letters Patent No. 609,370, dated August 16, 1898.

Application filed January 11, 1897. Serial No. 618,755. (No model.)

*To all whom it may concern:*

Be it known that I, JOHN W. SARGEANT, a citizen of the United States, residing at Elmwood, in the county of Cass and State of Nebraska, have invented certain new and useful Improvements in Plows; and I do hereby declare the following to be a full, clear, and exact description of the invention, such as will enable others skilled in the art to which it appertains to make and use the same.

My invention relates to improvements in corn-planters, and has for its object to provide the runner of a corn-planter with a double moldboard capable of adjustment and designed to remove the earth from either side of a line laid out by the marker or runner.

Referring to the drawings, Figure 1 is a perspective view of one end of the runner of an ordinary corn-planter provided with my attachment. Fig. 2 is a similar view of a moldboard and its adjusting mechanism.

Referring to the figures on the drawings, 1 indicates the runner of a corn-planter, (not illustrated,) and 2 and 3 indicate a pair of moldboards or the wings of a double moldboard provided with a rearwardly-inclined cutting edge formed by the convergence of the two moldboards, as illustrated. 6 indicates a pair of upright standards secured at the upper forward corners of each of the moldboards and provided, respectively, with a series of graduated apertures designed to receive a detachable pin 7, passing through an aperture 8 in the runner post or standard 9, extending upwardly from the runner and intermediate the standards 6. 9' indicates a looped strap connecting the diverging ends 10 of the moldboards and designed to receive in its loop 11 the rearwardly-extending body 12 of the runner 1. 13 indicates a series of graduated apertures in the runner designed to receive a detachable pin 14, passing through apertures in the loop of the strap and through one of the apertures 11.

It will be observed that by the employment of the mechanism described I am enabled to readily attach the moldboards to an ordinary corn-planter and that when so attached they may be adjusted horizontally or vertically or may be inclined out of the horizontal plane by permitting them to swing upon the pin 14, while the standards 6 are adjusted vertically.

I do not desire to limit myself to the details of construction shown and described, but reserve to myself the right to change, modify, or vary them at will within the scope of my invention.

What I claim is—

In a device of the character described, the combination with a runner and runner post or standard disposed at right angles and provided respectively with a series of apertures, of a moldboard provided with a pair of parallel standards designed to embrace the runner-post and provided with securing mechanism, and a strap connecting the diverging ends of the moldboards, and provided with a loop for the reception of the runner, and a fastening-pin securing the runner therein, substantially as specified.

In testimony whereof I have signed this specification in the presence of two subscribing witnesses.

JOHN W. SARGEANT.

Witnesses:
C. GRAHAM,
C. W. MATHEWS.